United States Patent
Kato et al.

(10) Patent No.: US 7,186,106 B2
(45) Date of Patent: Mar. 6, 2007

(54) MOLDING MACHINE AND MOLDING METHOD

(75) Inventors: Tsukasa Kato, Toyota (JP); Hidenori Uebayashi, Toyota (JP); Takashi Hirai, Toyota (JP); Yoshiki Matsuura, Toyota (JP); Hiroaki Furuya, Ube (JP)

(73) Assignees: Toyota Jidosha Kabushiki Kaisha, Toyota (JP); Ube Machinery Corp., Ltd., Ube (JP)

( * ) Notice: Subject to any disclaimer, the term of this patent is extended or adjusted under 35 U.S.C. 154(b) by 485 days.

(21) Appl. No.: 10/782,761

(22) Filed: Feb. 23, 2004

(65) Prior Publication Data

US 2004/0178536 A1 Sep. 16, 2004

(30) Foreign Application Priority Data

Feb. 24, 2003 (JP) .............................. 2003-046011

(51) Int. Cl.
*B29C 33/22* (2006.01)
(52) U.S. Cl. ...................... 425/169; 425/190; 425/225; 425/590; 425/595; 425/451.2; 425/451.9
(58) Field of Classification Search ................ 425/169, 425/190, 193, 225, 589, 590, 595, 451.2, 425/451.9
See application file for complete search history.

(56) References Cited

U.S. PATENT DOCUMENTS 3,951,579 A * 4/1976 Myers et al. ............... 425/190

4,948,358 A * 8/1990 Kushibe et al. ............. 425/589
5,017,120 A * 5/1991 Holzinger et al. .......... 425/190
5,192,557 A    3/1993 Hirata
5,417,913 A * 5/1995 Arend ....................... 425/595
5,542,465 A * 8/1996 Wolniak .................... 425/451.9
6,120,722 A * 9/2000 Schad ........................ 425/190

FOREIGN PATENT DOCUMENTS

JP 07-148807 6/1995
JP 09-201855 8/1997

* cited by examiner

*Primary Examiner*—James P. Mackey
(74) *Attorney, Agent, or Firm*—Finnegan, Henderson, Farabow, Garrett & Dunner, LLP

(57) ABSTRACT

In a molding machine, a fixed platen which supports a fixed die is disposed on one end of a base plate. A movable platen which supports a movable die and a supporting mount which supports each one end portion of the four tie bars are mounted on slide units. The movable platen and the supporting mount are advanced so as to close the die, a tip portion of each tie bar is locked to the fixed platen by a lock mechanism, and a die clamping cylinder provided on the movable platen is actuated to generate a clamping force so as to execute molding. After that, the lock mechanism executes an unlocking operation so as to cause the movable platen and the supporting mount to retreat to a die open position. Furthermore, an attaching and detaching mechanism releases the die clamping cylinder so as to cause only the supporting mount to significantly retreat from the movable platen, and thus the four tie bars are completely evacuated from the fixed die and the movable die.

11 Claims, 10 Drawing Sheets

(A)　　　　　　　(B)

MOLDING MACHINE AND MOLDING METHOD

BACKGROUND OF THE INVENTION

1. Field of the Invention

The present invention relates to a molding machine which is used for die-casting, injection molding, and blow molding and the like, and a molding method using the same molding machine.

2. Description of the Related Art

Conventionally, a molding machine, for example for die-casting, has a structure as shown in FIG. 15, wherein four tie bars 4 bridge between a fixed platen 2 and a supporting mount 3 secured at each end portion of a base plate 1. The tie bars 4 are inserted into a movable platen 5 which is slidably mounted on the base plate 1, and the movable platen 5 is advanced along the tie bars 4 to the fixed platen 2 side by die opening/closing and die clamping means 6 which is disposed between the supporting mount 3 and the movable platen 5. Accordingly, a movable die 8 supported by the movable platen 5 in relation to a fixed die 7 supported by the fixed platen 2 is closed, and at the same time, a clamping force is generated between both. Note that reference numeral 9 denotes an injector 9 provided on a back side of the fixed platen 2 for injecting molten metal to the mold. In general, an injector like this employs the die opening/closing and die clamping means 6 equipped with a toggle mechanism 6b which is driven by a cylinder 6a as a driving source, as shown in this drawing, since such die opening/closing and die clamping means 6 is capable of applying a large clamping force to the mold.

Meanwhile, small-scale production of a wide variety of products is common in recent production lines, and a mold changing cycle has been significantly shortened. Furthermore, a component to be molded by casting, injection molding or the like are becoming more and more complicated or large-sized, which inevitably reduces the lifetime of a mold and increases frequency of mold changing. Particularly, in die-casting where a high temperature molten metal is filled into a mold at a high speed and high pressure, the mold is so damaged that it needs to be changed quite frequently. However, in a common molding machine as shown in FIG. 15, there are four tie bars 4 around the fixed die 7 and the movable die 8, and these tie bars 4 not only hinder mold changeover work but also make installation of an automatic die changeover machine difficult.

Meanwhile, a molding machine for die-casting requires various types of peripheral devices (incidental equipment) including a molded component extraction device, a die lubricant application device, a cast product (insert) attachment device and the like. However, since the tie bars 4 described above restrict an installation space and a working range of the incidental equipment, designing under constraints (after-design) is compelled. Therefore, durability and reliability of the incidental equipment is impaired, which is a major cause for reduced rate of operation of the molding machine.

Meanwhile, in the field of injection molding, as disclosed in Japanese Patent Application Laid-Open Nos. 9-201855 and 7-148807, an injection molding machine is proposed. In this injection molding machine, one end portions of four tie bars are respectively supported by a movable plate (movable platen), and a lock mechanism provided on a fixed plate (fixed platen) locks and unlocks the other end portions of the tie bars. Furthermore, die opening/closing means advances the movable plate toward the fixed plate so as to close a fixed die on the fixed plate and a movable die on the movable plate. Next, the lock mechanism secures the other end portions of the tie bars to the fixed plate. In this state, die clamping means built into the movable plate (as disclosed in Japanese Patent Application Laid-Open No. 9-20185) or die clamping means provided in a tie bar insertion portion of the fixed plate (disclosed in Japanese Patent Application Laid-Open No. 7-148807) is actuated to generate a clamping force. After molding, at the same time when the lock mechanism is actuated to execute unlocking operation allowing the die opening/closing means to open the mold, the four tie bars are removed from the movable plate.

However, according to the injection molding machine as disclosed in the two patent documents mentioned above, although the four tie bars are removed from the fixed platen at the same time of the die opening, the tie bars are not completely evacuated from the periphery of the mold. This results in not only insufficient improvement in changeover operability but also insufficient improvement of space limitation with regard to the incidental equipment. Note that in the injection molding machines as disclosed in the two patent documents, a countermeasure is taken where a cylinder for removing the tie bars is provided on a top portion of the movable platen (movable plate, or movable die plate), which causes only the upper tie bars to retreat after the die opening. However, since the lower tie bars remain in the periphery of the mold still with the die in an open state, improvement of the space limitation with regard to the incidental equipment is still insufficient, and thus the countermeasure does not solve the problem fundamentally.

SUMMARY OF THE INVENTION

The present invention is conceived of in view of the above described problems arising from the related art, and objects of the invention are to provide a molding machine which has sufficiently improved the space limitation with regard to the incidental equipment as well as and has improved changeover operability, and to provide an efficient molding method utilizing this molding machine.

In order to solve the problems described above, a molding machine according to the present invention is characterized by including: a fixed platen which is disposed at one end of a base plate and which supports a fixed die; a movable platen which supports a movable die; a supporting mount which supports each one end portion of four tie bars which are inserted through the movable platen, where the movable platen and the supporting mount are disposed on the front and rear of the base plate such that the movable platen is capable of advancing/retreating with respect to the fixed platen; die opening/closing means which causes the movable platen and the supporting mount to advance/retreat so as to carry out die opening/closing by moving the movable in relation to the fixed die, and which causes the supporting mount to retreat from the movable platen after opening the die; and a lock mechanism which is provided in the fixed platen, and which locks/unlocks the other end portion of each tie bar which is inserted in the fixed platen when closing the die; and die clamping means which is disposed between the movable platen and the supporting mount, and which causes the movable platen to travel toward the fixed platen side in a die closed state so as to generate a clamping force between the fixed die and the movable die.

Furthermore, in order to solve the problems described above, a molding method according to the present invention using the molding machine is characterized by comprising the steps of: advancing the movable platen and the supporting mount using the die opening/closing means so as to carry out die closing of the movable die in respect to the fixed die; inserting a tip portion of each of the four tie bars, one end portion of which is supported by the supporting mount at the fixed platen; securing the tip portion of each tie bar using the lock mechanism in this state; executing molding by actuating die clamping means to generate a clamping force between the fixed die and the movable die; and causing the lock mechanism to execute an unlocking operation and actuating the die opening/closing means so as to retreat the movable platen and the supporting mount to a die open position; and retreating the supporting mount from the movable platen so as to evacuate the four tie bars from a vicinity of the fixed die and the movable die.

In the molding machine as configured above and in the molding method, each of one end portion of each of the four tie bars is supported by the supporting mount disposed behind the movable platen. Therefore, it is possible to completely evacuate the four tie bars from the vicinity of the fixed die and the movable die, by further retreating the supporting mount after opening the die.

In the present molding machine, it is possible to mount the movable platen and the supporting mount respectively on slide plates which are slidably coupled to a common rail disposed on the base plate through a bearing guide. In this way, use of the slide plates coupled to the rail through the bearing guide for moving the movable platen and the supporting mount stabilizes the movement of the movable platen and the supporting mount for a long period.

In this case, it is preferable that the movable platen is mounted on the slide plate so as to be capable of floating on the slide plate. Accordingly, even if a great lateral force acts on the movable platen, the movable platen oscillates and a load applied to the bearing guide is reduced, whereby breakage of the bearing guide is prevented.

Furthermore, in this case, any selected means may be applied for mounting the movable platen on the slide plate so as to be capable of floating on the slide platen, but the means may be configured by convex and concave tapered fitting portions which are set at a center and four corners of the slide plate. The means may be structured such that the convex portion which constitutes the convex and concave tapered fitting portion at the center is formed by a fixed pin and the convex portion which constitutes each of the convex and concave tapered fitting portions at the four corners is formed by a movable pin which is capable of floating upward and downward, respectively.

In the present molding machine, the supporting means which supports one end portion of the tie bars to the supporting mount may be configured by a screw portion which is disposed at the one end portion of the tie bars which are inserted through the supporting mount and which project toward the back side of the supporting mount, a nut which is screwed to the screw portion, and urging means which constantly secures the nut by pressing it to the supporting mount. As described above, by supporting the one end portion of the tie bars, utilizing urging force of the urging means, even if a tip of the tie bars should come into contact with the fixed platen or an obstacle, the tie bars move relatively to the supporting mount, whereby safety is insured.

In this case, a dog may be provided projecting from one end of the tie bar and a limit switch maybe disposed around an elongation line of the tie bar to be engaged with the dog when the tie bar moves relatively to the supporting mount. This allows contact of the tie bar to be reliably detected, and the power source of the molding machine to be stopped immediately, whereby safety is insured.

In the present molding machine, a guide roller may be disposed in a tie bar insertion hole of the movable platen, which supports the tie bar when closing the die and retreats from a supporting portion when clamping the die. Accordingly, it is possible to inhibit the tie bar from drooping down and to prevent contact.

Moreover, a plurality of air jet ports may be provided in a bush which is fitted into the tie bar insertion hole of the fixed platen, which jet compressed air in the forward direction of an insertion side of the tie bar and in the radially inward direction of the tie bar. Accordingly, it is possible to purge foreign matter attached to a tip portion of the tie bar with air which is jetted from the air jet port, thereby insuring a smooth operation of the lock mechanism which locks and unlocks the tip portion of the tie bar to the fixed platen.

In the present molding machine, the die opening/closing means may be configured by two driving means which independently drive the movable platen and supporting mount. In this case, it is possible to move the movable platen and the supporting board at any selected timing, whereby a degree of freedom in the molding cycle is enhanced. Also in this case, it is preferable that each driving means is structured such that it is driven by a servo motor, thereby enabling speed control and position control of the movable platen and the supporting mount to be executed accurately.

Furthermore, the molding machine may be structured such that the die clamping means is configured by a die clamping cylinder which is disposed on the movable platen, and an attaching and detaching mechanism which attaches and detaches a rod end portion of the die clamping cylinder to the supporting mount, and the die clamping cylinder and the detaching and attaching mechanism are disposed at four corners which are at the inside of each tie bar. With a configuration of the die clamping means like this, a clamping force is evenly generated between the fixed die and the movable die. Furthermore, since only a compression load is applied to the movable platen, cylinder packing of the die clamping cylinder is not asymmetrically worn, and the operation of the cylinder is stable for a long period of time.

As explained above, according to the molding machine and the molding method of the present invention, it is possible to make all four tie bars evacuate completely from the vicinity of the fixed die and the movable die for each molding operation. Therefore, as well as significantly improving efficiency in changing the dies, a space limitation for the incidental equipment, in particular, is significantly improved. Therefore, the incidental equipment, which is designed later, does not require incorporation of designing under constraints. Therefore, durability and reliability of the incidental equipment are improved, thereby significantly improving operating rate.

DETAILED DESCRIPTION OF THE PREFERRED EMBODIMENT

Figure 1:
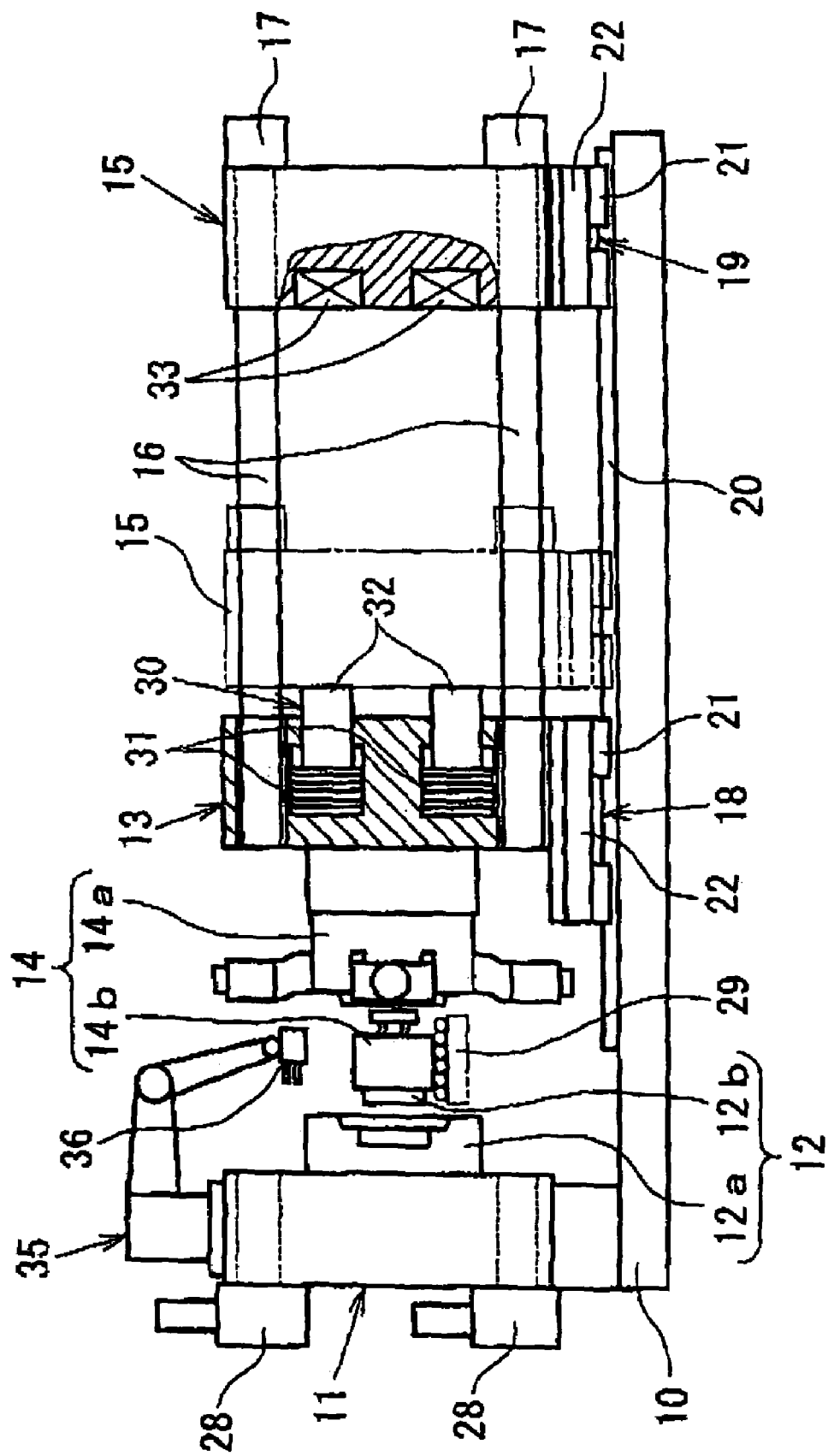
FIG. 1 is a side view of an entire structure of a molding machine for die-casting according to an embodiment of the present invention, with a sectional view in part.

Hereafter, an embodiment of the present invention will be explained with respect to the attached drawings.

FIGS. 1 to 4 show an entire structure of a molding machine for die-casting according to an embodiment of the present invention. In these drawings, reference numeral 10 denotes a base plate, 11 denotes a fixed platen which supports a fixed die 12, 13 denotes a movable platen which supports a movable die 14, and 15 denotes a supporting mount 15 which supports, by supporting means 17 to be described later, one end portions of respective four tie bars 16 which pass through the movable platen 13. The fixed platen 11 is secured to one end portion of the base plate 10, and the movable platen 13 and the supporting mount 15 are mounted on front and rear slide units 18 and 19, which are disposed on the base plate 10 so as to be capable of advancing/retreating with respect to the fixed platen 12.

The aforementioned front and rear slide units 18 and 19 are provided on the base plate 10, while sharing a pair of rails 20 extending in the longitudinal direction of the base plate 10. Each of the slide units 18 and 19 includes a slide plate 22 which is slidably coupled to the rails 20 through a bearing guide 21. The movable platen 13 and the supporting mount 15 are mounted on the slide plates 22 of the corresponding slide units 18 and 19 through concave and convex tapered fitting portions 23 (FIG. 4) to be described later, and independently advance/retreat with respect to the fixed platen 11 by a driving means 24 (FIG. 3) which serves as a die opening/closing device.

Figure 3:
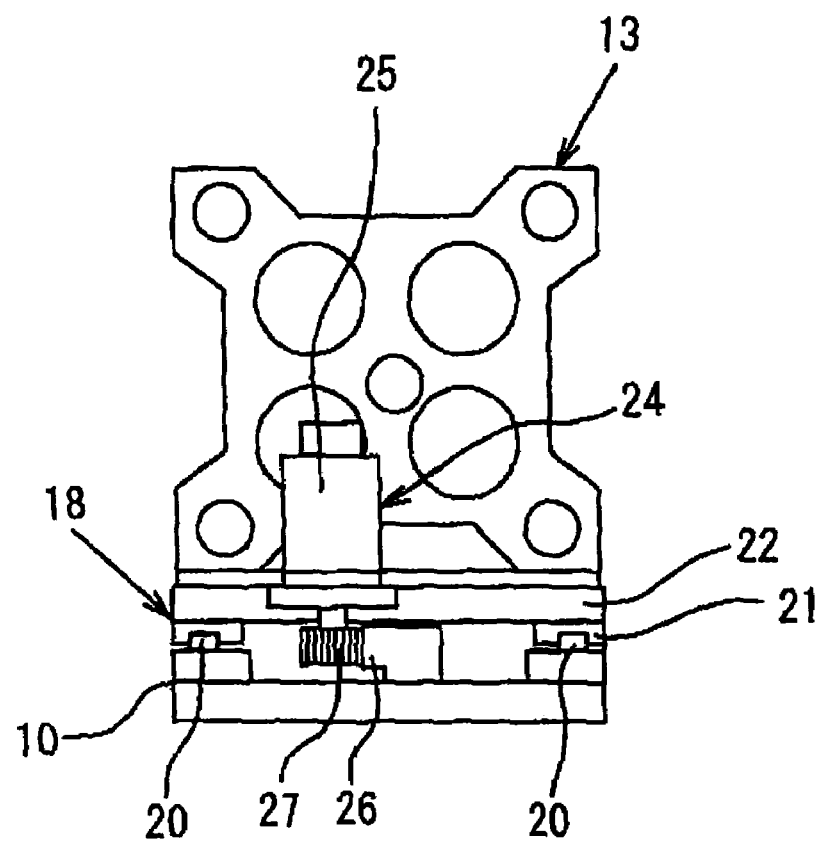
FIG. 3 is a front view of a slide unit and die opening/closing means in the molding machine.
Figure 4:
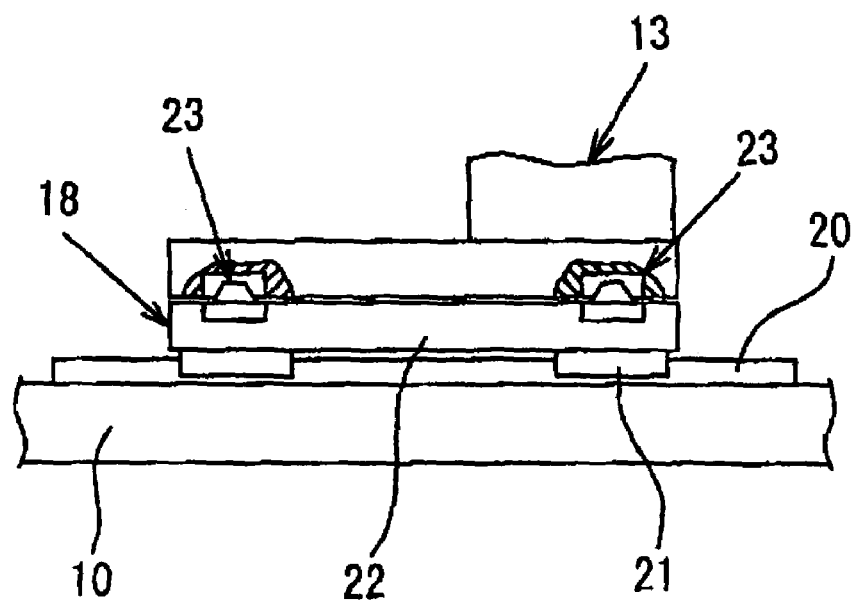
FIG. 4 is a side view of an installation state of a movable platen in the molding machine.

The driving means 24 herein is configured by a rack and pinion mechanism driven by a servo motor 25. The servo motors 25 are mounted on the slide plates 22 on which the movable platen 13 and the supporting mount 15 are mounted respectively. The rack and pinion mechanism which serves as the driving means 24 has a structure, as shown in FIG. 3, in which a rack 26 disposed between the paired rails 20 is meshed with a pinion 27 attached to an output shaft of the servo motor 25. Note that only the side closer to the movable platen 13 of the servo motor 25 and the pinion 27 are shown, the side closer to the supporting mount 15 is not illustrated.

The movable platen 13 and the supporting mount 15 advance/retreat with respect to the fixed platen 11 integrally with the front and rear slide units 18 and 19 that are independently driven by the corresponding servo motors 25. In accordance with the advancing/retreating of the movable platen 13 and the supporting mount 15, the movable die 14 is opened and closed to the fixed die 12 on the fixed platen 11. Meanwhile, one end portions of the four tie bars 16 are supported by the supporting mount 15, and the other end portions thereof are inserted into and removed from the fixed platen 11. In this case, since the movable platen 13 and the supporting mount 15 move driven by the servo motor 25, it is possible to execute accurate speed control and accurate positional control.

Figure 2:
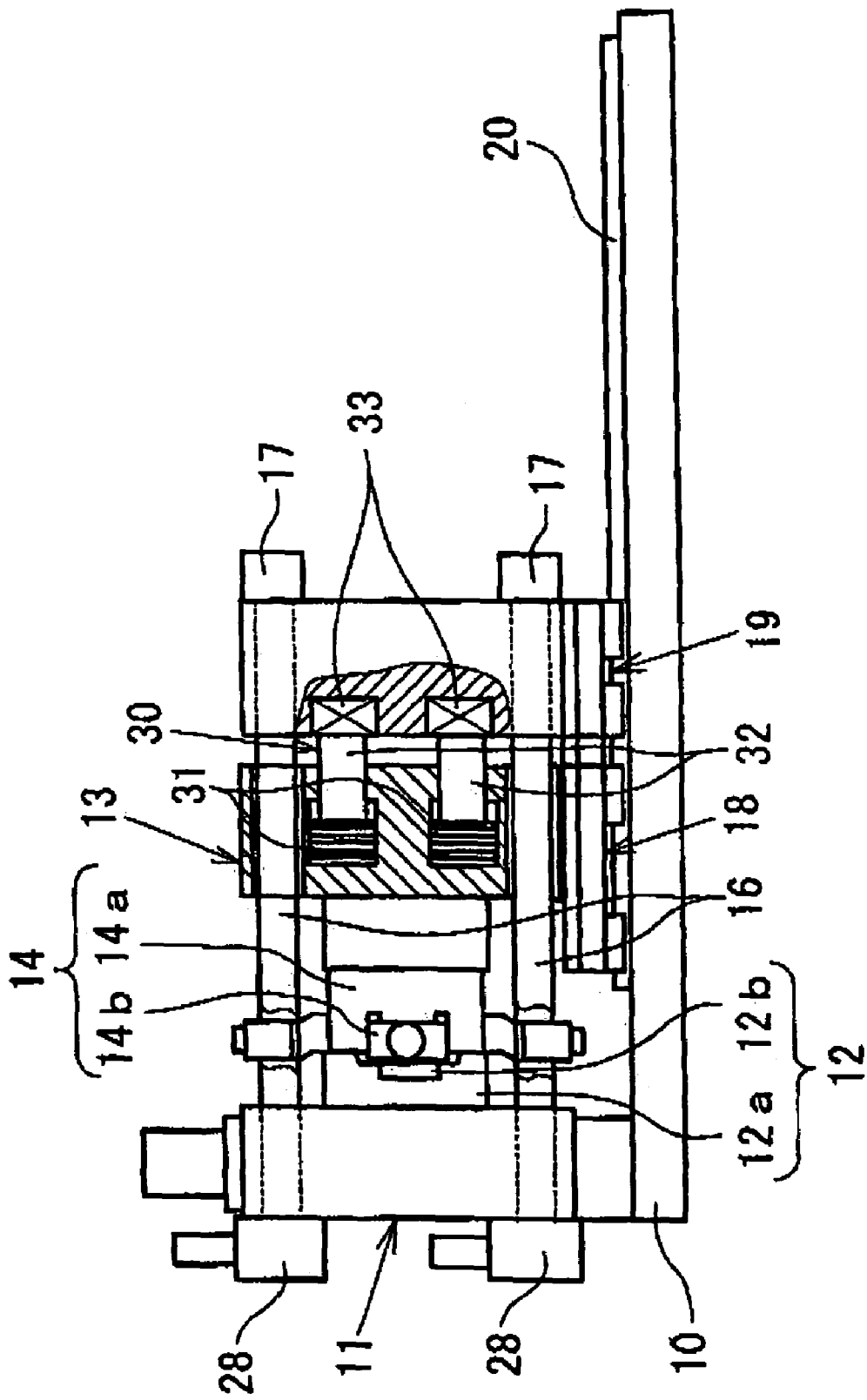
FIG. 2 is a side view of the entire structure of the molding machine in the die closed state.

A lock mechanism 28, to be described later, which locks and unlocks the other end portion (tip portion) of each of the tie bars 16 with respect to the fixed platen 11 is disposed to a back side of the fixed platen 11. The lock mechanism 28 executes a locking operation when closing the die, and executes an unlocking operation when opening the die. When closing the die, the locking operation of the lock mechanism 28 causes the fixed platen 11 and the supporting mount 15 to be coupled through the four tie bars 16, and the supporting mount 15 to be positioned with a small clearance from the movable platen 13, as shown in FIG. 2. On the other hand, when opening the die, the unlocking operation of the lock mechanism 28 allows the supporting mount 15 to move freely, and allows the supporting mount 15 to retreat to a position as shown by a solid line in FIG. 1 (stand-by position), at which the supporting mount 15 is separated at a large distance from the movable platen 13. Note that the supporting mount 15 has a die open position as shown by a chain-double dashed line in FIG. 1, and advances and retreats synchronically with the movable platen 13 between the die open position and a die closed position (as shown in FIG. 2).

In the present embodiment, the fixed die 12 and the movable die 14 are respectively configured by general portions 12a and 14a which are made for a common use and dedicated portions 12b and 14b which form a cavity. The dedicated portions 12b and 14b are automatically attached to and detached from the general portions 12a and 14a by an attaching and detaching mechanism (not shown). The dedicated portion 12b on the side of the fixed die 12 and the dedicated portion 14b on the side of the movable die 14 are integrated with each other by a coupling mechanism (not shown). At the time of die changing, as shown in FIG. 1, these dedicated portions 12b and 14b are delivered to a die changing apparatus 29 in an integrated manner. Note that the attaching and detaching mechanism, the coupling mechanism, the die changing apparatus 29 and the like are described in detail in Japanese Patent Application No. 2001-394717 filed by the inventors and others. Therefore, only the outline thereof has been explained hereinabove.

Moreover, die clamping means 30 is disposed between the movable platen 13 and the supporting mount 15 for generating a clamping force between the fixed die 12 and the movable die 14 which have been closed. The die clamping means 30 is configured by die clamping cylinders 31 which is housed in the movable platen 12, and attaching and detaching mechanisms 33 which attach and detach an end portion of rods 32 of each of the die clamping cylinders 31. Both the die clamping cylinders 31 and the attaching and detaching mechanisms 33 will be explained later. The die clamping cylinders 31 and the attaching and detaching mechanisms 33 are disposed at four positions at the inside of the tie bars 16. When the rods 32 are extended in the die closed state (as shown in FIG. 2) and in a state where a tip portion of the rods 32 is secured to the supporting mount 15 by the attaching and detaching mechanisms 33, the movable platen 13 travels toward the fixed platen 11 side, and the movable die 14 is evenly pressurized by the fixed die 12, thereby generating a clamping force between the movable die 14 and the fixed die 12.

Note that a robot 35 (FIG. 1) which serves as a molded component extraction device is disposed on the top of the fixed platen 11.

Figure 5:
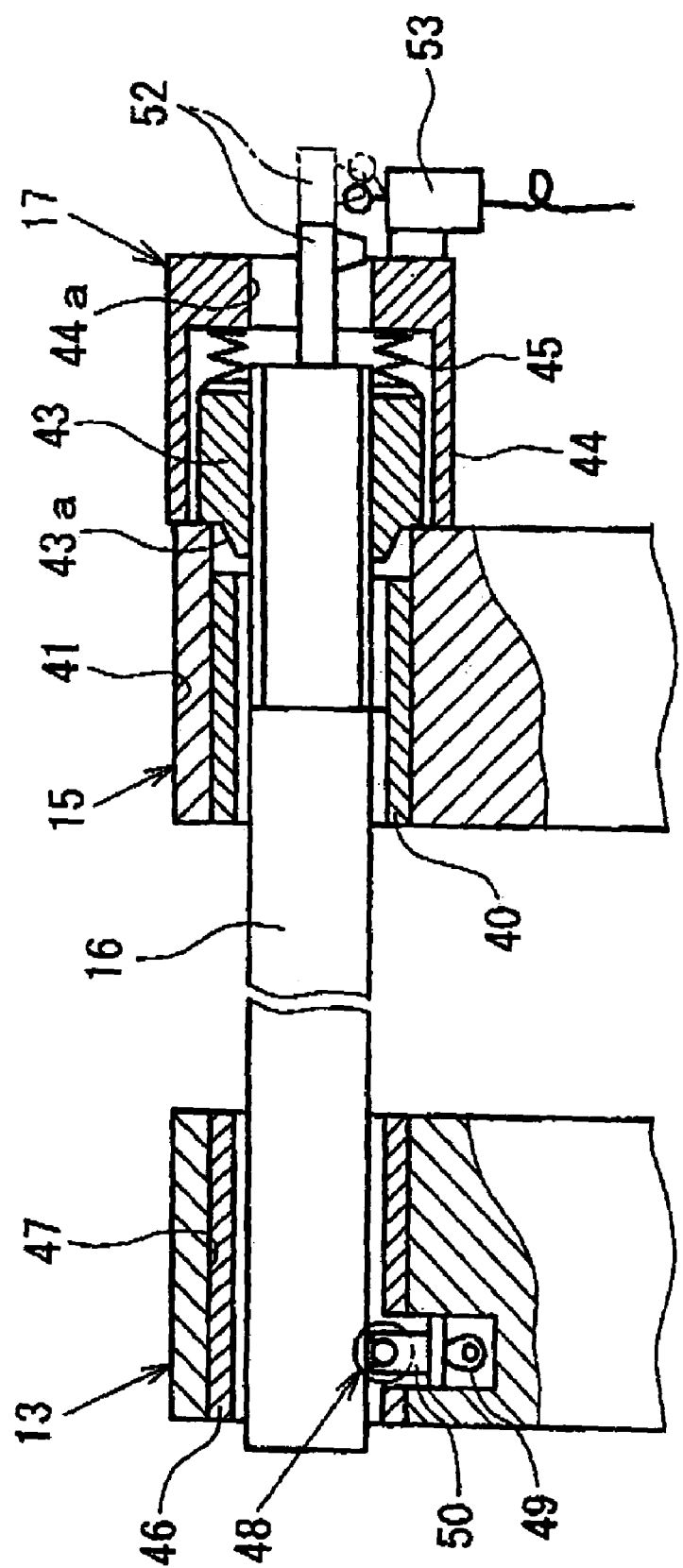
FIG. 5 is a sectional view of a tie bar supporting structure of a supporting mount and the movable platen in the molding machine.

The supporting means 17 for supporting the one end portion of each tie bar 16 to the supporting mount 15 is provided on the back side of the supporting mount 15. As shown in FIG. 5, the supporting mount 15 has a tie bar insertion hole 41 with a bush 40, which is used for inserting each tie bar 16. As also shown in FIG. 5, the supporting means 17 is configured by a screw portion 42 which is also provided at the one end portion of each tie bar 16, a nut 43 which is screwed to the screw portion 42, and a compression spring (urging means) 45. The compression spring 45 is interposed between the nut 43 and an inner bottom portion of a bottomed tubular casing 44 which is secured to a back side of the supporting mount 15 so as to surround the nut 43, and constantly secures the nut 43 by pressing it against the supporting mount 15. A truncated conic guide portion 43 is formed on a side of the nut 43 opposite to the supporting mount 15. The nut 43 is fixedly positioned to the supporting mount 15 using the guide portion 43a as a guidance, whereby each tie bar 16 is supported by the supporting mount 15 such that a horizontal state of the tie bar 16 is maintained.

Figure 6:
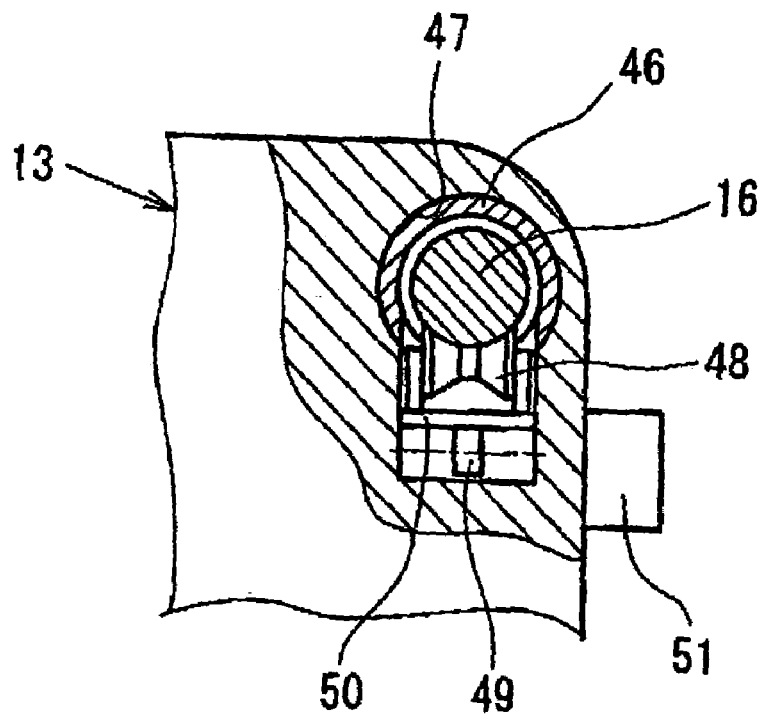
FIG. 6 is a sectional view of the tie bar supporting structure of the movable platen in the molding machine.

Although each tie bar 16 is supported by the supporting mount 15 such that a horizontal state of each tie bar 16 is maintained as described above, since a cantilever support is adopted, there is a risk that the tip portion side of each tie bar 16 will droop down, making insertion of the tie bar 16 into the fixed platen 11 difficult. Therefore, according to the present embodiment, and also as shown in FIG. 5, a guide roller 48 which supports the tie bar 16 so as to prevent it from drooping down is disposed in a tie bar insertion hole 47 with a bush 46, provided in the movable platen 13. As also shown in FIG. 6, the guide roller 48 is housed in the movable platen 13 such that the movable platen is capable of moving up and down and is supported by an elevating frame 50 which moves up and down using a cam 49. The cam 49 is rotatably driven by a motor 51 (as shown in FIG. 6) provided on a side face of the movable platen 13, and, in accordance with a leftward rotation or a rightward rotation of the cam 49, the guide roller 48 is selectively positioned to an ascendant end where it slightly projects from the inner surface of the bush 46, and a descendent end where it is slightly below the inner surface of the bush 46. Therefore, the guide roller 48 is positioned to the ascendant end when closing the die, and positioned to the descendent end when clamping the die, respectively. Accordingly, when closing the die, each_tie bar 16 is inhibited from drooping down and the tip portion thereof is smoothly inserted into the fixed platen 11. On the other hand, when clamping the die, since no excessive binding force is applied to each tie bar 16, tie bar 16 is inhibited from being deformed by bending.

Meanwhile, despite the effort to inhibit the tie bar 16 from drooping down using the guide roller 48, it might be possible that a tip of the tie bar 16 comes in contact with the fixed platen 11 or other obstacles (incidental equipment) for some reason. Therefore, in the present embodiment, as shown in FIG. 5, a dog 52 is provided projecting from one end of the tie bar 16. The dog 52 projects to the rearward from inside an opening 44a provided in a bottom portion of the casing 44 which configures the supporting means 17. On the other hand, a limit switch 53 engageable with the dog 52 is disposed around an elongation line of the tie bars 16, and is supported by the casing 44. In the present embodiment, should the tip of the tie bar 16 come into contact with the platen 11 or another obstacle, the tie bar 16 moves relatively to the supporting mount 15, resisting the urging force of the compression spring 45 which configures the supporting means 17. Therefore, the dog 52 is engaged with the limit switch 53, whereby the contact of the tie bar 16 is reliably detected.

Figure 7:
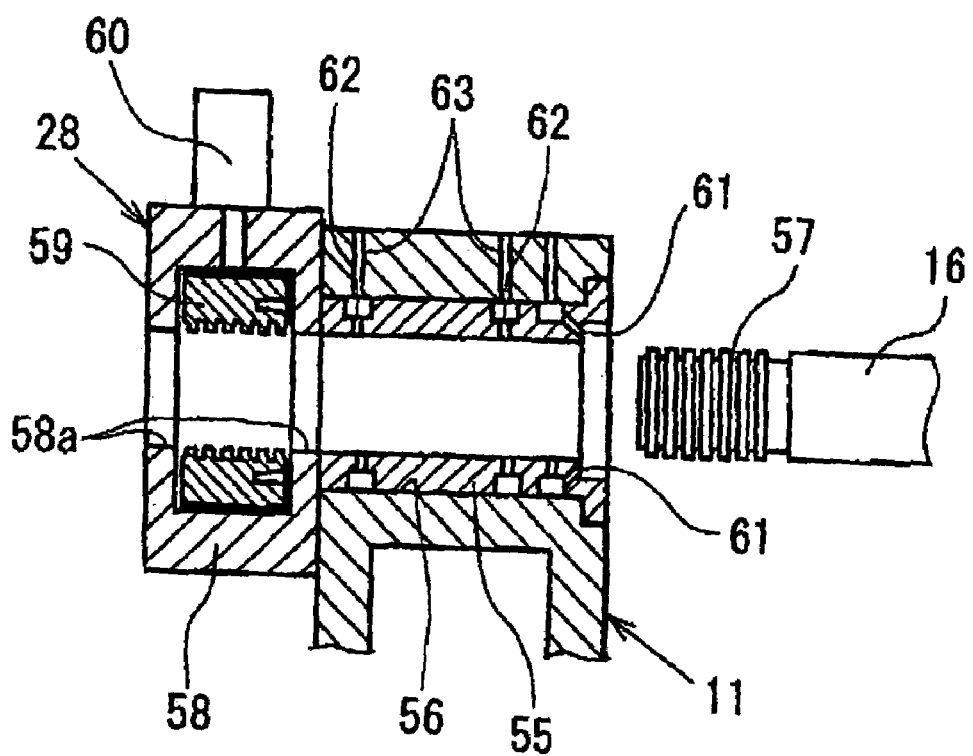
FIG. 7 is a sectional view of the tie bar supporting structure on the fixed platen side in the molding machine.
Figure 8:
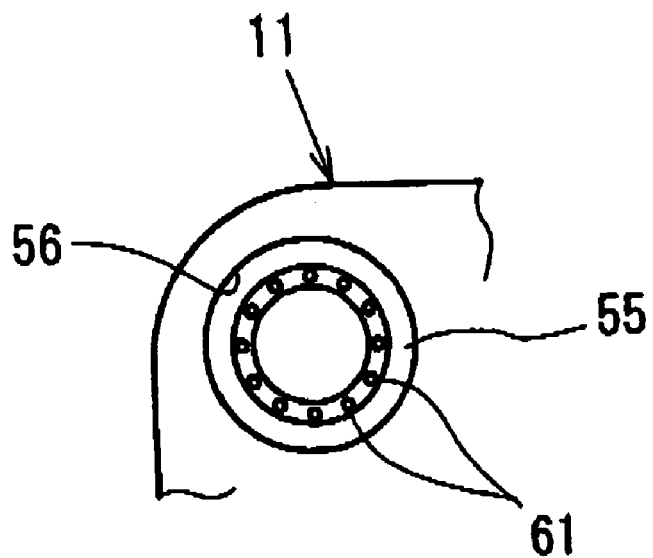
FIG. 8 is a sectional view of a structure of an inside portion of a tie bar insertion hole of the fixed platen.
Figure 9:
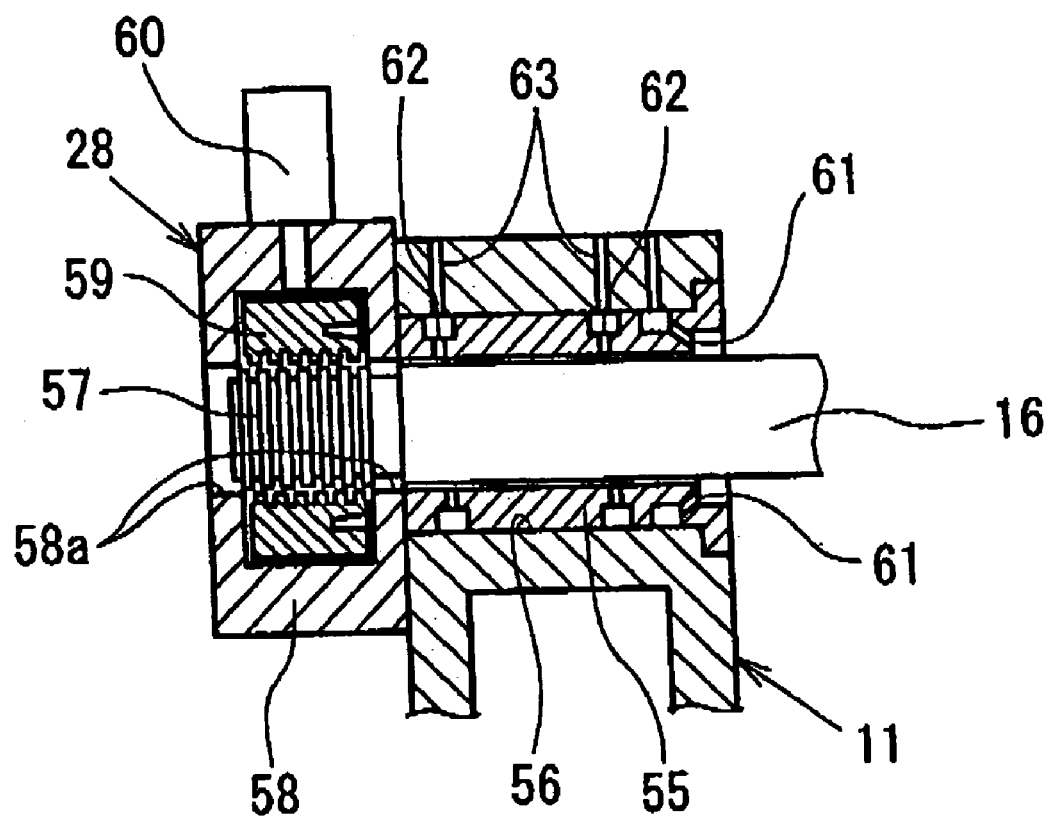
FIG. 9 is a sectional view of the tie bar supporting structure on the fixed platen side in the molding machine.

On the other hand, as described above, the lock mechanism 28 which locks and unlocks the tip portion of each tie bar 16 is provided on the back side of the fixed platen 11. Furthermore, as shown in FIGS. 7 to 9, the fixed platen 11 is provided with a tie bar insertion hole 56 having a bush 55 for inserting each tie bar 16. The lock mechanism 28 is configured by a circular multiple groove portion 57 formed at the tip portion of the tie bars 16, a split nut 59 disposed in a casing 58 which is secured to the back side of the fixed platen 11, and a cylinder 60 which is attached to the casing 58 for opening and closing the split nut 59. Openings 58a which allow the tie bar 16 to be inserted therethrough are formed in front and rear wall surfaces of the casing 58. Furthermore, as shown in FIG. 9, the multiple groove portion 57 of the tie bars 16 is positioned in the casing 58 through the openings 58a when closing the die. The lock mechanism 28 executes a locking operation when closing the die as described before. This locking operation accompanies a closing operation of the split nut 59 actuated by the cylinder 60, whereby the split nut 59 is meshed with the multiple groove portion 57 of the tie bars, and the tip portions of the tie bars 16 are positioned with respect to the fixed platen 11.

Meanwhile, when each of the tie bars 16 is inserted into and removed from the fixed platen 11 for each molding as in the present invention, foreign matter may become attached to the tie bar 16 more frequently, and there is a risk that the foreign matter may enter the split nut 59 of the lock mechanism 28 and inhibit the locking operation thereof. Therefore, in the present embodiment, as also shown in FIGS. 7 to 9, a plurality of first air jet ports 61 which are oriented toward the front in the direction of insertion of each tie bar 61 is provided at one end of the bush 55, and a plurality of second air jet ports 62 which are oriented inward in the radial direction are provided toward the inner surface of the bush 55. Accordingly, it is possible to supply compressed air to the first and second air jet ports 61 and 62 through an air passage 63 provided in the fixed platen 11. Due to this supply of compressed air into the first and second air jet ports 61 and 62, the foreign matter attached to the tip portion (multiple groove portion 57) of the tie bar 16 which is to be inserted into the bush 55 is purged. Furthermore, should foreign matter be brought into the split nut 59, it will be exhausted to the outside through the opening 58a of the casing 58. Moreover, when the tip portions of the tie bars 16 are inserted into the bush 55, an air film is formed between the both items by the compressed air which is injected from the second air jet port 62. Therefore, the air film functions as an air bearing, thereby inhibiting wearing of the multiple groove portion 57 at the tip side of the tie bar 16.

Figure 10:
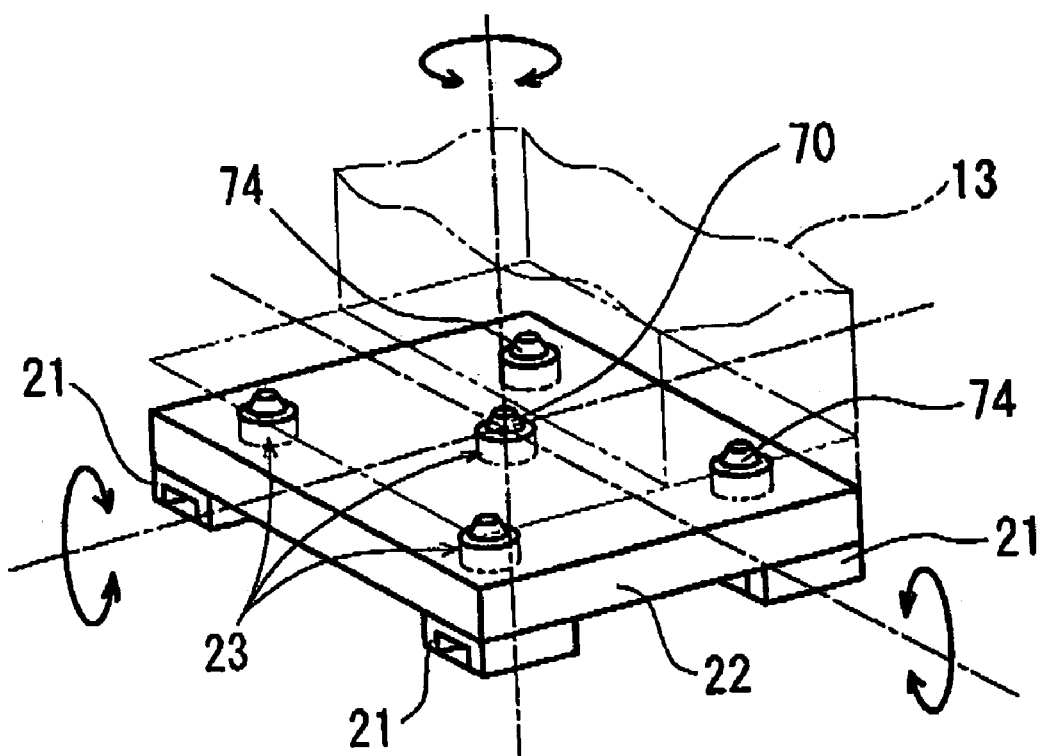
FIG. 10 is a perspective view schematically showing an installation structure of concave and convex tapered fitting portions provided between the slide unit and the movable platen in the molding machine.

The convex and concave tapered fitting portions 23, each of which is interposed between the movable platen 13 and the supporting mount 15, and the slide plates 22 on which the movable platen 13 and the supporting mount 15 are mounted, are provided at the center and the four corner portions of each slide plate 22 as shown in FIG. 10. Note that only the side closer to the movable platen 13 is shown herein, however, the side closer to the supporting mount 15 also has the same structure.

Figure 11:
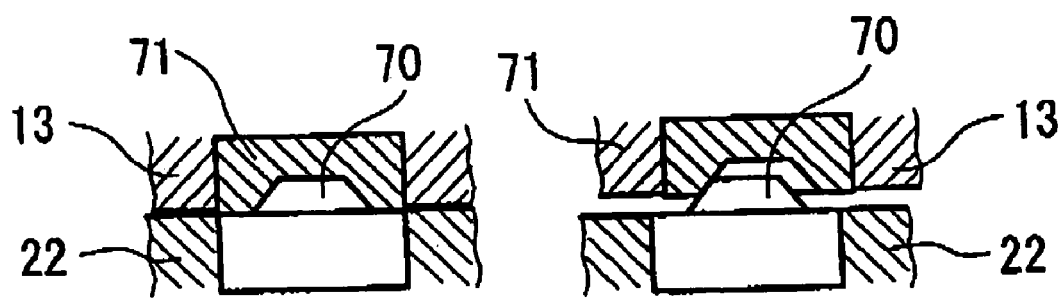
FIG. 11 is a sectional view showing a structure and an actuating state of the concave and convex tapered fitting portion disposed at the center among the concave and convex tapered fitting portions as shown in FIG. 10.
Figure 12:
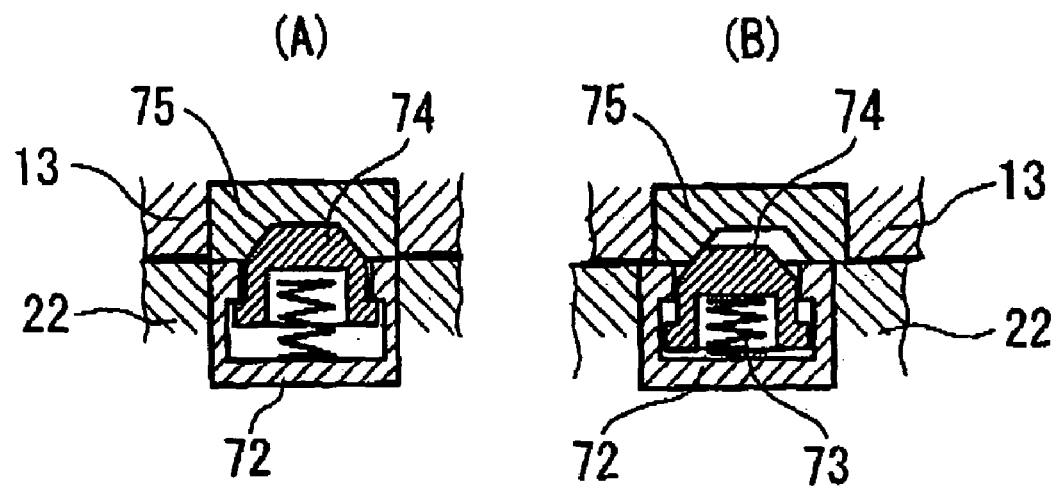
FIG. 12 is a sectional view showing a structure and an actuating state of the concave and convex tapered fitting portions disposed at the four corner portions among the concave and convex tapered fitting portions as shown in FIG. 10.

As shown in FIG. 11A, among the aforementioned convex and concave tapered fitting portions 23, the convex and concave tapered fitting portion 23 which is set at the center is configured by a fixed pin (convex portion) 70 whose base portion is embedded in the slide plate 22, and a concave member 71 which is embedded in the bottom surface side and which receives the aforementioned fixed pin 70. On the other hand, as shown in FIG. 12A, the convex and concave tapered fitting portions 23 which are set at the four corners are configured by a movable pin (convex portion) 74 and a concave member 75. The movable pin 74 is disposed so as to be capable of floating through a spring 73 in a bottomed tubular guiding member 72 which is embedded in the slide plate 22, and the concave member 75 is embedded on the bottom surface side of the movable platen 13 and which receives the movable pin 74.

The aforementioned fixed pin 70 and the concave member 71 at the center are fitted with each other in a tapered manner. When a large lateral force is applied to the movable platen 13, the concave member 71 slides along the fixed pin 70 as shown in FIG. 11B, and consequently the movable platen 13 floats slightly above the slide plate 22. On the other hand, the movable pins 74 and the concave members 75 at the four corners are also fitted with each other in a tapered manner. When a large lateral force is applied to the movable platen 13, as shown in FIG. 12B, the movable pin 74 descends resisting the urging force of the spring 73. Consequently, when the movable platen 13 is subject to a large lateral force the movable platen 13 can move slightly in the lateral direction. In other words, the movable platen 13 oscillates, that is, rolls, pitches, or yaws, whereby a load applied to the bearing guide 21 of the slide units 18 and 19 is reduced, and breakage of the bearing guide 21 can be prevented.

Figure 13:
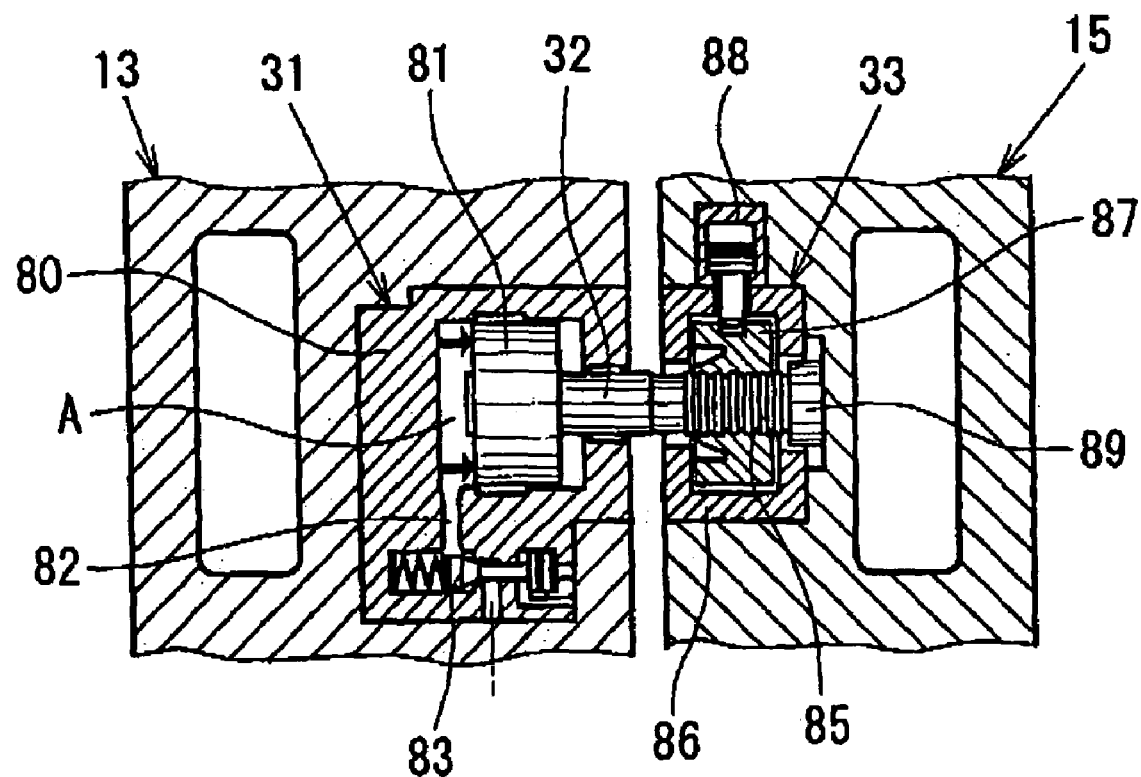
FIG. 13 is a sectional view showing a structure of die clamping means in the molding machine.
Figure 14:
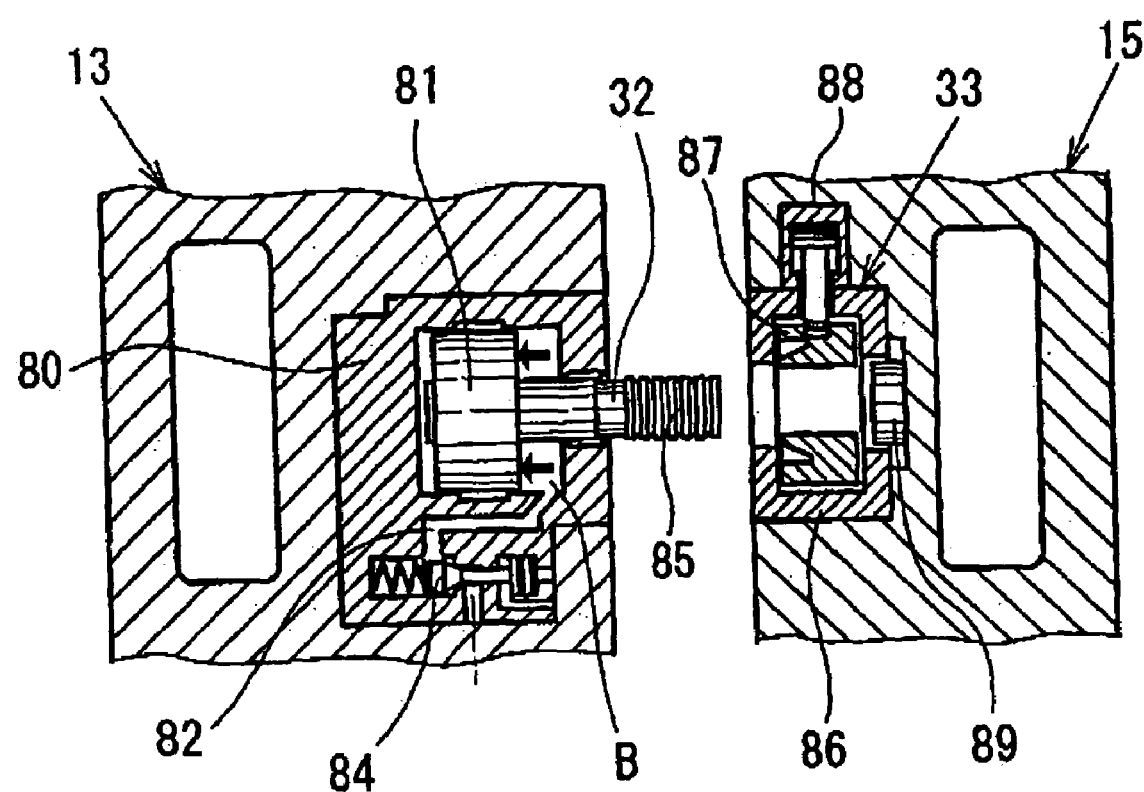
FIG. 14 is a sectional view showing a structure of the die clamping means in the molding machine.

Moreover, as shown in detail in FIGS. 13 and 14, each die clamping cylinder 31 which constitutes the die clamping means 30 is configured by a cylinder body 80, a piston 81, the rod 32, and a hydraulic circuit 82. The cylinder body 80 is housed in the movable platen 13, and the piston 81 is slidably housed in the cylinder body 80. Furthermore, one end of the rod 32 is coupled to the piston 81, and the other end is inserted into the bottom portion of the cylinder body 80 in a liquid tight manner and extends toward the supporting mount 15 side. The hydraulic circuit 82 supplies and releases pressure oil into the cylinder body 80, and has solenoid valves 83 and 84 interposed therein. Due to switching of the solenoid valves 83 and 84, pressure oil is supplied to a head-side chamber A in the cylinder body 80 when clamping the die (FIG. 13), while pressure oil is supplied to a rod-side chamber B in the cylinder body 80 when not clamping the die (that is, when opening and closing the die).

Meanwhile, each attaching and detaching mechanism 33 which is used for attaching and detaching the die clamping cylinder 31 to the supporting mount 15 is configured by a circular multiple groove portion 85 formed at the tip portion of the rod 32 of the die clamping cylinder 31, a split nut 87 disposed in a casing 86 which is housed in the supporting mount 15, a cylinder 88 which is attached to the casing 86 and which opens and closes the split nut 87, and a positioning stopper 89 which restricts an insertion end of the rod 32.

In the die clamping means 30 with a configuration as above, the rod 32 of the die clamping cylinder 31 is positioned at a short end when opening the die. In this state, when the supporting mount 15 approaches the fixed platen 13, the tip portion of the rod 32 is inserted into the attaching and detaching mechanism 33 until the tip portion abuts the positioning stopper 89. Therefore, when the cylinder 88 closes the split nut 87 in this state, the split nut 87 is meshed with the multiple groove portion 85 at the tip portion of the rod 32, and the tip portion of the rod 32 of the die clamping cylinder 31 is coupled to the supporting mount 15 through the attaching and detaching mechanism 33. On the other hand, after the die is closed, when the rod 32 of the die clamping cylinder 31 is actuated to extend in a state where the tip of the rod 32 remains coupled to the supporting mount 15, the movable platen 13 advances to the fixed platen 11 side and a clamping force is generated between the movable die 14 and the fixed die 12. Therefore, when clamping the die, deflection (curvature) is generated on the fixed platen 11 and the supporting mount 15 which are coupled to each other through the tie bars 16. However, since only a compression load is applied to the movable platen 13 by the die clamping cylinders 31 which are located at the four points, a clamping force is generated between the movable die 14 and the fixed die 12. Moreover, cylinder packing in the die clamping cylinder 31 is not asymmetrically worn, and stable operation of the die clamping cylinder 31 may be maintained for a long period. Furthermore, a clamping force is efficiently generated since each of the die clamping cylinders 31 supplies the pressure oil to the head-side chamber A thereof.

Hereinafter, a molding method (die-casting method) using a molding machine with the aforementioned structure will be explained.

At the time of starting die-casting, as shown in FIG. 1, the movable platen 13 and the supporting mount 15 are positioned respectively at the die open position and the stand-by position (the position shown by the bold line) which is separated by a large distance from the supporting mount 15. Note that although FIG. 1 shows a state when changing dies, the dedicated portions 12b and 14b are of course housed in the corresponding general portions 12a and 14a during a casting cycle. First, rotation of the corresponding servo motor 25 causes the supporting mount 15 to advance integrally with the slide unit 19 and to stop at the die open position as shown by a chain-double dashed line in FIG. 1. This advancement of the supporting mount 15 causes the tip portion (multiple groove portion 85) of the rod 32 of the die clamping cylinder 31 to be inserted in the attaching and detaching mechanism 33 at the supporting mount 15 side. At the same time when the supporting mount 15 has stopped, the cylinder 88 in the attaching and detaching mechanism 33 is actuated, and the split nut 87 is meshed with the multiple groove portion 85 of the rod 32, whereby the movable platen 13 and the supporting mount 15 are coupled to each other through the die clamping cylinder 31 and the attaching and detaching mechanism 33 (FIG. 13).

On the other hand, the advancement of the supporting mount 15 causes only a small portion of the tip portion of each tie bar 16 one end of which is supported by the supporting mount 15 to be inserted into the tie bar insertion hole 47 (or the bush 46 thereof). At this time, the guide roller 48 in the tie bar insertion hole 47 of the movable platen 13 is positioned at the ascending end, and each tie bar 16 is smoothly inserted in the tie bar insertion hole 47 of the fixed platen 11 without the tip portion of the tie bar 16 drooping down. Note that should the tip of one of the tie bars 16 comes in contact with the fixed platen 11, the dog 52 which is integrally provided with the tie bars 16 is engaged with the limit switch 53, and each of the driving sources for the molding machine is stopped in accordance with a signal generated by the limit switch 53.

After this, the servo motor 25 on the movable platen 13 side and the servo motor 25 on the supporting mount 15 side rotate in a synchronized manner, and the movable platen 13 and the supporting mount 15 advance integrally with the corresponding slide units 18 and 19, respectively. Accordingly, the movable die 14 on the movable platen 13 is closed by the fixed die 12 on the fixed platen 11. In accordance with this die closing, the tip portion (multiple groove portion 57) of each tie bar 16, one end of which is supported, is inserted through the tie bar insertion hole 47 of the fixed platen 11 and reaches inside of the lock mechanism 28 (FIG. 9). Next, upon completion of the die closing, the cylinder 60 in the lock mechanism 28 is actuated, causing the split nut 59 to be meshed with the multiple groove portion 57 of each tie bar 16, whereby the fixed platen 11 and the supporting mount 15 become coupled to each other through the four tie bars 16. Note that upon the start of the molding cycle, compressed air is supplied to the first and second air discharge ports 61 and 62 of the bush 56 of the fixed platen 11, whereby foreign matter is purged from the tip portion of the tie bar 16.

After completion of the die closing, the die clamping cylinder 31 is actuated to extend the rod 32. Next, the movable platen 13 advances to the fixed platen 11 side, and the movable die 14 is evenly pressurized by the fixed die 12, whereby a clamping force is generated between both. At this time, despite the fact that a large bending force is applied to the tie bar 16, a large enough bending force to permanently deform the tie bar 16 is not applied since the guide roller 48 in the movable platen 13 has lowered to the descendent end prior to the die clamping. On the other hand, a large lateral force is applied on the movable platen 13 and the supporting mount 15 due to the die clamping. However, the concave and convex tapered fitting portion 23 is provided between the movable platen 13 and the supporting mount 15, and the corresponding slide plate 22. Therefore, the movable platen 13 or the supporting amount 15 oscillates, that is, rolls, pitches, or yaws, whereby breakage of the bearing guide 21 of the slide units 18 and 19 can be inhibited.

Figure 15:
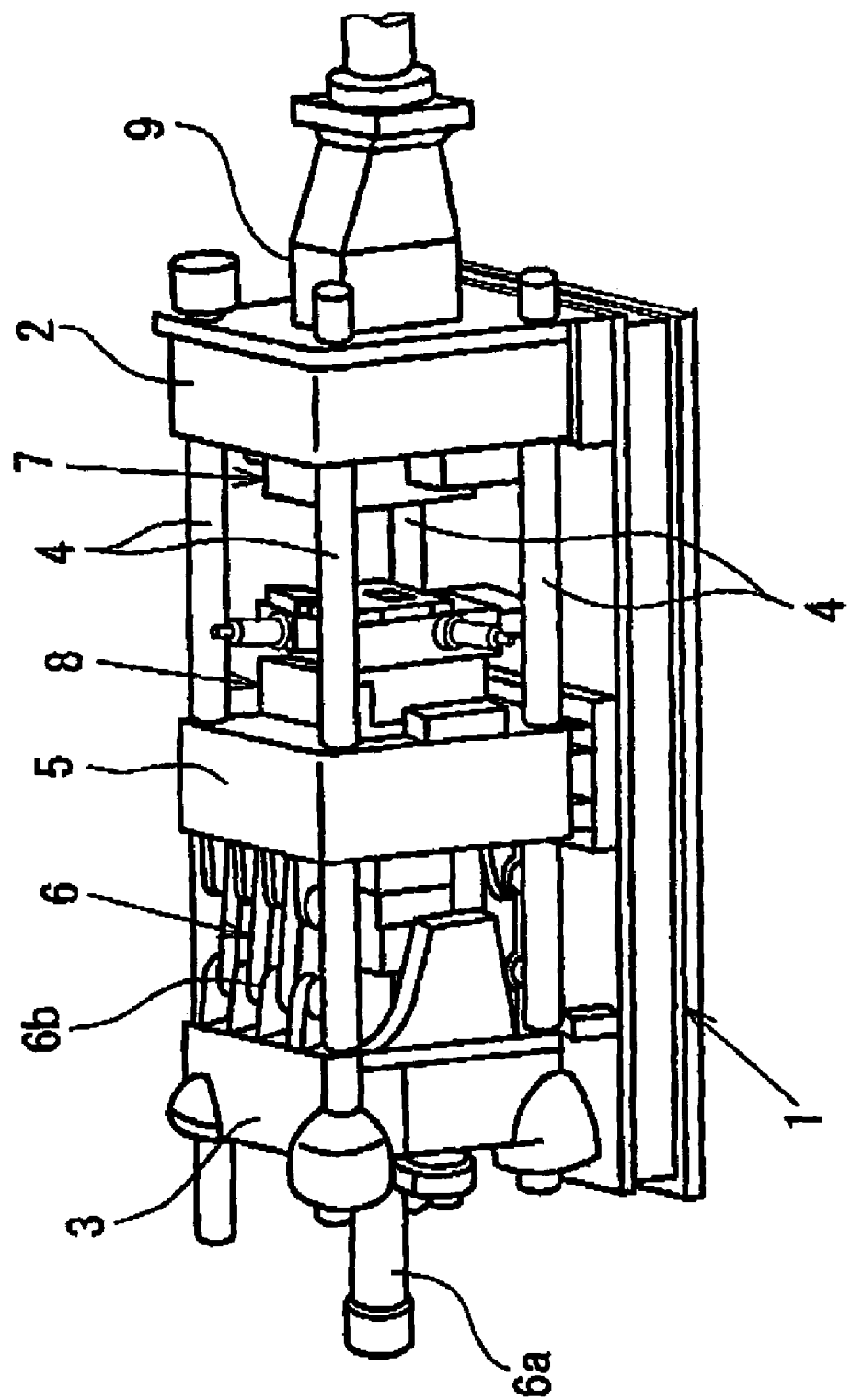
FIG. 15 is a perspective view of a conventional structure of a molding machine for die-casting.

After completion of the die clamping described above, an injection mechanism (as shown by numeral 9 in FIG. 15) attached to the fixed platen 11 injects molten metal in the cavity which is formed between the fixed die 12 and the movable die 14. Next, upon completion of solidification of the molten metal, the die clamping cylinder 31 is actuated to cause the rod 32 thereof to execute a shortening operation and the movable platen 13 retreats, whereby the movable die 14 is separated from the fixed die 12. Next, at the same time when the lock mechanism 28 executes an unlocking operation, the servo motor 25 on the movable platen 13 side and the servo motor 25 on the supporting mount 15 side are rotated in a reverse direction in a synchronized manner, and the movable platen 13 and the supporting mount 15 retreat integrally with the corresponding slide units 18 and 19. Accordingly, the movable die 14 on the movable platen 13 is separated by a large distance from the fixed die 12 on the fixed platen 11, and the movable platen 13 and the supporting mount 15 retreat up to the die open position as shown in FIG. 1 and stop.

Next, at the die open position as described above, the cylinder 88 in the attaching and detaching mechanism 33 which configures the die clamping means 30 is actuated to open the split nut 87, and the coupling between the movable platen 13 and the supporting mount 15 is released. This release of the coupling causes the servo motor 25 on the supporting mount 15 side to rotate again, whereby the supporting mount 15 retreats to the stand-by position (the position shown by the bold line) which is separated by a large distance from the movable platen 13. Meanwhile, in accordance with this retreat of the supporting mount 15 to the stand-by position, the end portion of the tie bar 16 other than the end portion supported by the supporting mount 15 is completely removed from the fixed platen 11, and the end portion is completely evacuated from the vicinity of the fixed die 12 and the movable die 14, as shown in FIG. 1.

After that, the robot 35 which is disposed on the top portion of the fixed platen 11 is actuated to move an attaching and detaching jig 36 provided at a tip of the arm to a front portion of the movable die 14. Next, in time with this movement, an extruding mechanism built in the movable die 14 is actuated to knock the molded component out from the movable die 14 and to deliver it to the attaching and detaching jig 36. Upon completion of this delivery, the robot 35 is able to use its arm so as to take the molded component out of the molding machine and to deliver it to a conveyer system. At this time, since the robot 35 is able to freely place its arm in a molded component take-out position and a molded component delivery position without interfering with the tie bars 16, the degree of freedom in designing the robot 35 is improved and a molding cycle time is reduced. Note that, as well as in the case of the robot 35, the degree of freedom in designing other incidental equipment such as a die lubricant application device and a cast product attachment device and the like is also enhanced.

Moreover, also when changing the dedicated portions 12*b* and 14*b*, since there is no tie bar 16 around the fixed die 12 and the movable die 14, it is possible to efficiently change these portions by freely letting the die change apparatus 29 (FIG. 1) in and out of the molding machine. Furthermore, also when changing the general portions 12*a* and 14*a*, since there is no need to take into consideration interference with the tie bar 16, it is possible to efficiently change these portions, for example, by using a crane.

In the present embodiment described above, a rack and pinion mechanism is used as the driving means 24 which moves the movable platen 13 and the supporting mount 15 on the base plate 10. In place of the rack and pinion mechanism, a ball and screw mechanism, a cylinder mechanism, or the like, can be used as the driving means 24. However, taking into consideration speed control and positional control of the movable platen 13 and the supporting mount 15, it is preferable to adopt a ball and screw mechanism for which the same servo motor 25 as that used in the aforementioned rack and pinion mechanism can be used as a driving source.

The invention claimed is:
1. A molding machine comprising:
a fixed platen which is disposed at one end of a base plate and which supports a fixed die;
a movable platen which supports a movable die;
a supporting mount which supports respective end portions of four tie bars which are inserted through the movable platen; the movable platen and the supporting mount being disposed on the front and rear of the base plate so as to be capable of advancing/retreating with respect to the fixed platen, die opening/closing means which causes the movable platen and the supporting mount to advance/retreat so as to carry out die opening/closing by the movable die in relation to the fixed die, and which causes the supporting mount to retreat from the movable platen after opening the die; and a lock mechanism which is provided in the fixed platen, and which, in relation to the fixed platen, locks/unlocks the other end portion of each tie bar which is inserted in the fixed platen when closing the die; and die clamping means which is disposed between the movable platen and the supporting mount, and which causes the movable platen to travel toward the fixed platen side in a die closed state so as to generate a clamping force between the fixed die and the movable die.

2. The molding machine according to claim 1, wherein the movable platen and the supporting mount are respectively mounted on a slide plate which is slidably coupled to a common rail disposed on the base plate through a bearing guide.

3. The molding machine according to claim 2, wherein the movable platen is mounted on the slide plate such that the movable platen is capable of floating on the slide plate.

4. The molding machine according to claim 3, wherein means for mounting the movable platen on the slide plate so as to be capable of floating is configured by convex and concave tapered fitting portions which are set at a center and four corners of the slide plate, in which a convex portion which constitutes the convex and concave tapered fitting portion at the center is formed by a fixed pin which is capable of floating upward and downward, respectively.

5. The molding machine according to any one of claims 1 to 4, wherein the supporting means which supports the one end portion of the tie bar to the supporting mount is configured by a screw portion which is disposed at the one end portion of the tie bar which is inserted through the supporting mount and which projects toward the back side of the supporting mount, a nut which is screwed to the screw portion, and urging means which constantly secures the nut by pressing it to the supporting mount.

6. The molding machine according to claim 5, wherein a dog is provided projecting from one end of the tie bar and a limit switch is disposed around an elongation line of the tie bar to be engaged with the dog when the tie bar moves relatively to the supporting mount.

7. The molding machine according to claim 1, wherein a guide roller is disposed in a tie bar insertion hole of the movable platen, which supports the tie bar when closing the die and retreats from a supporting portion when clamping the die.

8. The molding machine according to claim 1, wherein a plurality of air jet ports are provided in a bush which is fitted into the tie bar insertion hole of the fixed platen, which jet compressed air in the forward direction of an insertion side of the tie bar and in the radially inward direction of the tie bar.

9. The molding machine according to claims 1, wherein the die opening/closing means is configured by two driving means which independently drive the movable platen and supporting mount.

10. The molding machine according to claim 9, wherein each driving means is driven by a servo motor.

11. The molding machine according to claims 1, wherein the die clamping means is configured by a die clamping cylinder which is disposed on the movable platen, and attaching and detaching mechanisms which attaches and detaches a rod end portion of the die clamping cylinder to the supporting mount, and the die clamping cylinder and the attaching and detaching mechanism are disposed at four corners which are at the inside of each tie bar.

* * * * *

UNITED STATES PATENT AND TRADEMARK OFFICE
CERTIFICATE OF CORRECTION

| | | |
|---|---|---|
| PATENT NO. | : 7,186,106 B2 | Page 1 of 1 |
| APPLICATION NO. | : 10/782761 | |
| DATED | : March 6, 2007 | |
| INVENTOR(S) | : Tsukasa Kato et al. | |

It is certified that error appears in the above-identified patent and that said Letters Patent is hereby corrected as shown below:

In claim 9, column 14, line 21, "claims" should read --claim--.

In claim 11, column 14, line 27, "claims" should read --claim--.

Signed and Sealed this

Twenty-sixth Day of June, 2007

JON W. DUDAS
*Director of the United States Patent and Trademark Office*